E. M. COYNE.
ABDOMINAL SUPPORTER.
APPLICATION FILED APR. 17, 1918.
1,316,771.
Patented Sept. 23, 1919.
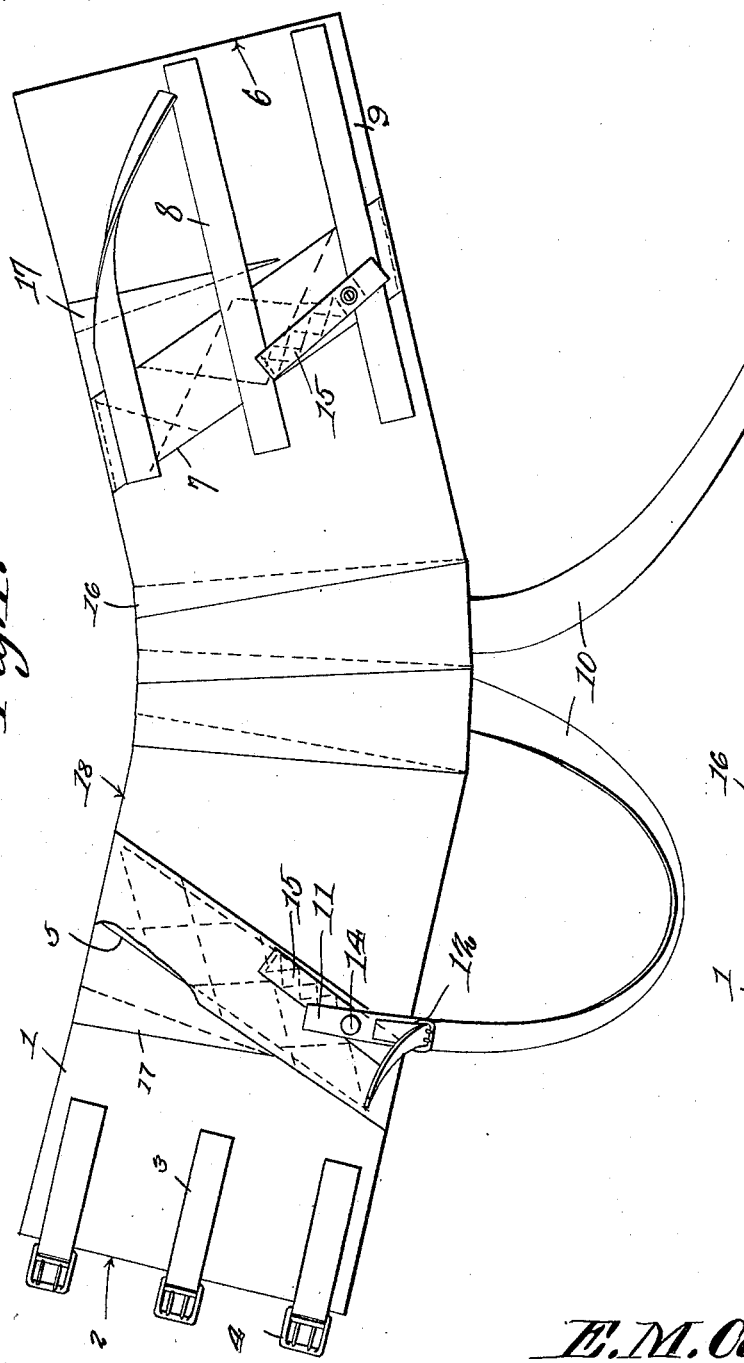
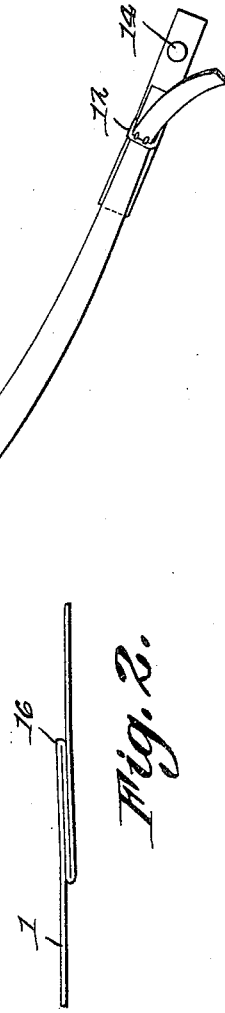
Inventor
E. M. Coyne

UNITED STATES PATENT OFFICE.

EDWARD M. COYNE, OF CHATHAM, ONTARIO, CANADA.

ABDOMINAL SUPPORTER.

1,316,771.  Specification of Letters Patent.  Patented Sept. 23, 1919.

Application filed April 17, 1918. Serial No. 229,147.

*To all whom it may concern:*

Be it known that I, EDWARD M. COYNE, a citizen of the United States, residing at Chatham, in the Province of Ontario and Dominion of Canada, have invented new and useful Abdominal Supporters, of which the following is a specification.

The device forming the subject matter of this application is adapted to be used after surgical operations, in connection with unusual obesity, where one or more ruptures are present, and under many other conditions which will suggest themselves to those skilled in the art.

It is one object of the invention to provide a device of the type described which will afford the necessary support for the abdomen, and be capable of ready adjustment to the body of the wearer.

Another object of the invention is to provide a device of the kind alluded to which will be strong and well adapted to withstand any strain imposed by the perineal strap.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in elevation, a bandage constructed in accordance with the present invention; and Fig. 2 is a fragmental top plan.

The bandage forming the subject matter of this application includes a belt 1, preferably made of one or more layers of cloth or other flexible material. At one end 2 of the belt 1, straps 3 are secured, the straps carrying buckles 4. Disposed between the constituent layers of the belt 1 and arranged relatively near to the end 2 is a diagonal reinforcement 5 which is flexible and ordinarily made of some material which is slightly heavier than the material out of which the belt 1 is fashioned. The opposite end of the belt is denoted by the numeral 6 and arranged between the layers of the belt, near to the end 6 is a diagonal reinforcement 7 constructed like the reinforcement 5. Straps 8 are attached to the belt and to the reinforcement 7, and since the reinforcement 7 and consequently the attached ends of the straps 8 are set back from the end 6 of the belt, the said end of the belt forms a flexible tongue 9, adapted to extend beneath the end 2 when the belt is disposed around the body of the wearer, the tongue 9 serving to prevent the buckles 4 from contacting with the flesh of the wearer, when as is contemplated the straps 8 are assembled with the buckles.

The numeral 10 marks a pair of perineal straps each attached at one end to the belt 1, intermediate the ends of the belt. The perineal straps include extensions 11 united with the main portions 10 of the straps by means of buckles 12. Snap fasteners 14 unite the parts 11 with tension strips 15 secured to the outside of the belt 1 and secured to the reinforcements 5 and 7. It will be obvious that the perineal straps may be lengthened or shortened by adjusting the free ends of the members 10 in the buckles 12, it being possible to separate the perineal straps readily and quickly from the belt, without altering the length of the perineal straps, by releasing the snap fasteners 14.

The belt 1 may be folded transversely intermediate its ends as shown at 16, to form V-shaped plaits, and, in a similar way, V-shaped plaits may be fashioned in the belt adjacent the ends thereof, as shown at 17. The folded portions, which form the plaits 16 and 17 may be stitched together, and any desired number of plaits may be formed, thus causing the belt to be concave downwardly intermediate its ends, as shown at 18. In this way, the belt may be made to extend beneath the abdomen and afford the necessary support, notably in connection with the diagonal reinforcements 5 and 7. The perineal straps 10 are attached to the belt 1 and to the reinforcements 5 and 7, the structure thus being well adapted to withstand the pull imposed by the perineal straps.

The structure is so constructed that it may be laundered at any time, thus providing an article which is thoroughly sanitary. The belt is first applied about the body, the perineal straps being placed between the legs and tightened until the required pressure on the sides of the abdomen is secured. When pressure on one side only is required one of the perineal straps may be omitted, such an operation being desirable in case of an incisional rupture, or when the muscles are weaker on one side of the abdomen than they are on the other. The belt may be made in many different sizes and widths, and a heavier belt may be used in winter than is employed in summer, but the same desirable features will always be present, namely, pressure on the abdomen, an upward lift, and soft comfortable edges. The structure is adapted for use by either sex and may be worn by patients of all ages. In hernia of rupture pressure is required at the bottom of the abdomen, and the device shown in this application affords pressure where the same is most needed. The device is a bandage in every sense of the word and will accomplish what any other surgical bandage can do, and also be of use in maternity cases and where corpulency exists from any cause whatsoever. One of the advantages of the present structure arises out of the fact that it will prevent surgical dressings from shifting. Especial attention is directed to the fact that this device embodies, in a single structure, an obesity bandage, a surgical bandage, a maternity bandage, and a truss bandage. The bandage may be made to conform to the shape of the body from the hips, or including the hips and the general construction is such that the wearer is not put in misery by cutting or chafing. Among the advantages of the structure are, its lifting power from the bottom up, its simplicity, its capacity for adjustments through a wide range, its cleanliness, and the comfort which it affords the wearer.

I claim:—

In a device of the class described, a belt comprising walls; diagonal reinforcements between the walls and extended from the upper edge of the belt to the lower edge thereof; diagonal tension strips applied exteriorly to one of the walls in alinement with the reinforcements and connected to said wall and to the reinforcements; perineal straps attached at one end to the intermediate portion of the belt; means for detachably connecting the other ends of the perineal straps to the tension strips; the device being further characterized by the fact that the belt is folded upon itself transversely to form V-shaped plaits, the parts of the plaits being connected together, the plaits serving to cause the belt to curve downwardly intermediate its ends, thereby to provide an abdominal support, the plaits being adapted to be ripped free to adjust the downward curve of the belt.

In testimony that I claim the foregoing as my own, I have hereto affixed my signature in the presence of two witnesses.

EDWARD M. COYNE.

Witnesses:
O. W. BROWN,
ALFRED E. RYAN.

Copies of this patent may be obtained for five cents each, by addressing the "Commissioner of Patents Washington, D. C."